United States Patent [19]

Moore et al.

[11] Patent Number: 4,986,708

[45] Date of Patent: Jan. 22, 1991

[54] SELF-SEALING SEPARATION FASTENER FOR SMALL CONFINES

[75] Inventors: Martin E. Moore; Robert R. Bennett, both of San Diego, Calif.

[73] Assignee: The United States of America as represneted by the Secretary of the Navy, Washington, D.C.

[21] Appl. No.: 365,170

[22] Filed: Jun. 12, 1989

[51] Int. Cl.⁵ ............................................. F16B 13/04
[52] U.S. Cl. .................................. 411/20; 411/390; 411/391; 411/396
[58] Field of Search ................................. 411/2-5, 411/8-10, 19, 20, 390, 391, 396, 383, 916, 917

[56] References Cited

U.S. PATENT DOCUMENTS

| | | | |
|---|---|---|---|
| 2,489,984 | 11/1949 | Shoemaker | 411/390 X |
| 2,653,504 | 9/1953 | Smith | 411/396 X |
| 3,119,298 | 1/1964 | Brown | 411/396 X |
| 3,352,189 | 11/1967 | Brown | 411/391 |
| 3,386,138 | 6/1968 | Overman | 411/396 X |
| 3,405,593 | 10/1968 | Kriesel | 85/33 |
| 3,408,890 | 11/1968 | Bochman, Jr. | 85/1 |
| 3,449,996 | 6/1969 | Takahashi | 411/391 |
| 3,530,759 | 9/1970 | Francis | 411/391 |
| 3,546,996 | 12/1970 | Grijalva | 411/396 X |
| 3,546,999 | 12/1970 | Hosang | 411/391 X |
| 3,754,496 | 8/1973 | Noel | 89/1 |
| 4,421,005 | 12/1983 | Byrne | 89/1 B |
| 4,671,715 | 6/1987 | Berg | 411/8 |
| 4,884,934 | 12/1989 | Ikeda et al. | 411/383 |

FOREIGN PATENT DOCUMENTS 2203470 8/1973 Fed. Rep. of Germany ...... 411/390

Primary Examiner—Robert L. Wolfe
Assistant Examiner—Suzanne L. Dino
Attorney, Agent, or Firm—Harvey Fendelman; Thomas Glenn Keough; Peter A. Lipovsky

[57] ABSTRACT

A separable fastener includes a fastener body having a head end and a shank end. The head end defines a generally cylindrical open ended cavity in which a cylindrical punch is disposed. The cavity is sealed and closed by a gas generator that develops an increasing fluid pressure against the punch. The punch is restrained within the cavity by a retaining ring which yields once a preselected gas pressure is reached. The release of the punch causes it to rapidly accelerate in a short distance to impact the shank end of the fastener body. The shank end is thereby sheared from the body with the void created in the body being sealed by the impacting punch.

13 Claims, 1 Drawing Sheet

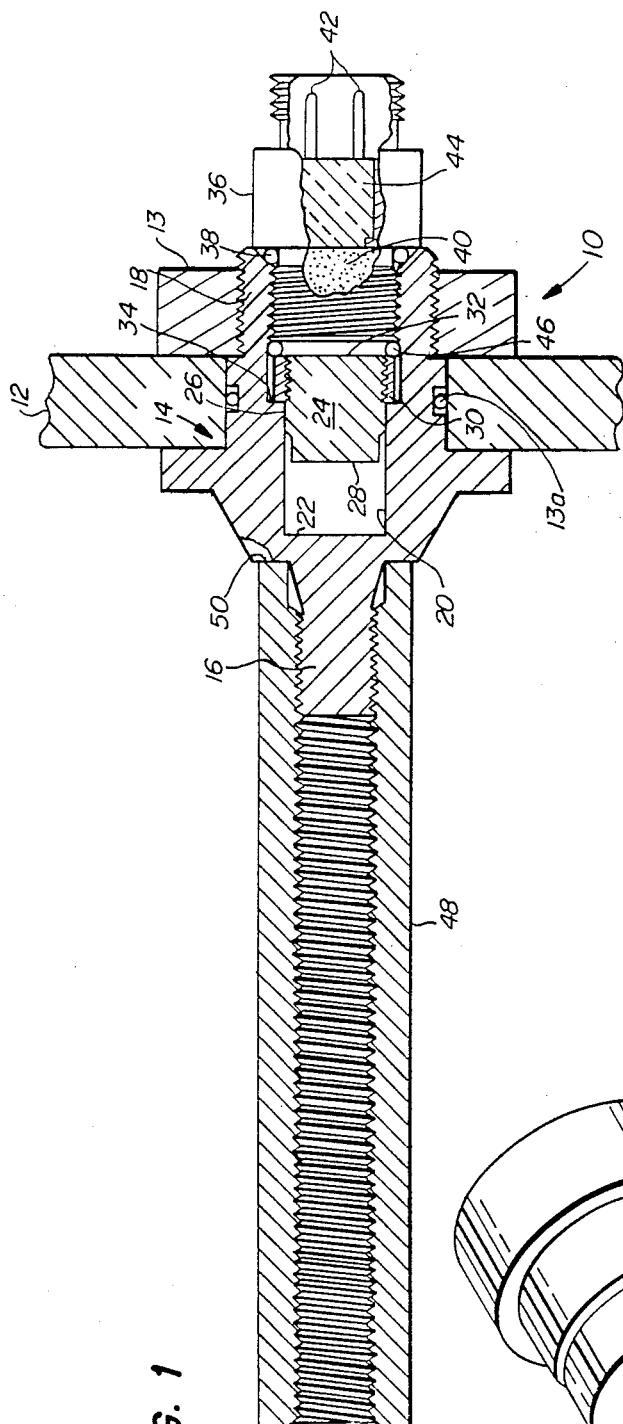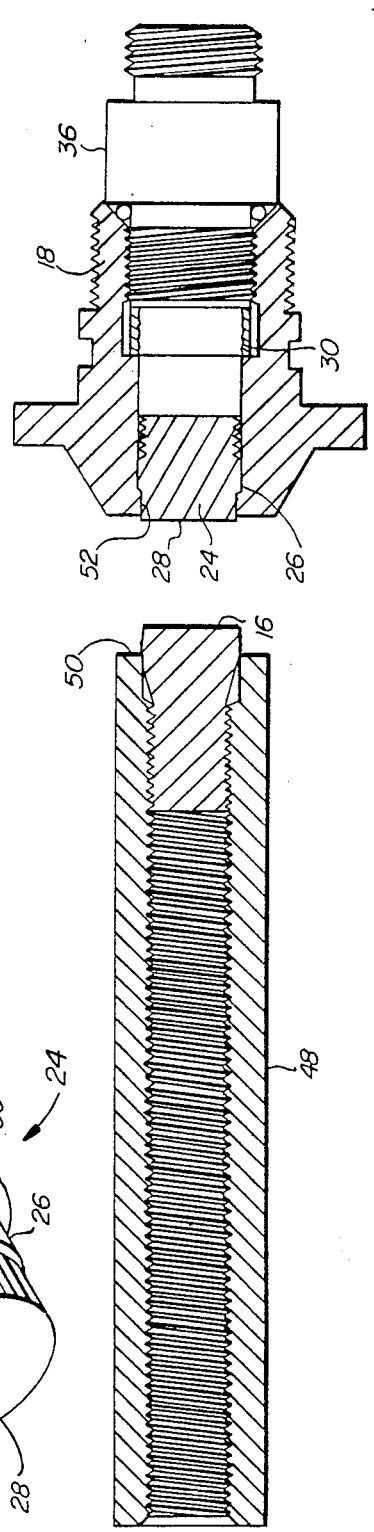

SELF-SEALING SEPARATION FASTENER FOR SMALL CONFINES

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

1. Field of the Invention

This invention pertains broadly to the field of separation fasteners. More particularly, the invention pertains to separation fasteners utilizing gas pressure. In still greater particularity, but without limitation thereto, the invention pertains to a gas pressure shear separation fastener suitable for use in small confines and where sealing of the fastener after separation is desired.

2. Description of the Prior Art

Separable fasteners are well known in the fastener art. Generally, these fasteners can be broken into one of several categories: those which are separated by tensile forces, those which are separated by shear forces and those separated by pressure overload forces. In these categories, both explosives as well as gas generators have been used to generate the necessary forces for separation.

In cases in which an explosive is used, the pressure wave caused by the explosion can do more than merely separate the fastener. The explosion can cause portions of the bolt body to disintegrate thereby propelling shrapnel into nearby instruments, structures and/or people. Furthermore, the shock of the explosion can damage sensitive equipment or components. In instances where gas generators are utilized a more controlled separation is possible, however oftentimes gas generator separation fasteners incorporate pistons or plungers that occupy a relatively large amount of space.

In either tensile, shear, explosive or gas generating fasteners, separation of the fasteners can leave a path through which fluids may travel. In underwater environments, for example, such a path poses obvious hazards.

SUMMARY OF THE INVENTION

The invention substantially overcomes the aforementioned described deficiencies of the prior art by providing a gas pressure driven separation fastener suitable for use in close confines and in environments in which a sealing of the fastener after separation is desired.

A gas generator is used to separate the relatively high strength bolt of the invention. The use of the gas generator avoids the undesirable detonation effects of prior art explosive separation fasteners.

The invention incorporates a single piston that is retained by a restraining ring until a desired preselected gas pressure is reached. The restraining ring then yields so that the "punch" piston is accelerated rapidly to shear a shank end from a head end of the fastener's body. By restraining the punch piston until a desired preselected pressure is reached, explosive pressures are avoided, yet the punch piston is driven at a sufficiently high enough speed so that a relatively short "throw" of the piston is possible. The short throw of the piston allows a relatively small fastener body permitting the invention to be used in small confines. Further, the punch piston lodges within and seals the void created by the piston upon shearing the shank end of the fastener from the fastener body head. This sealing prevents a communication path from being formed through the separated fastener.

According to a preferred but optional embodiment of the invention, a collar having a die surface is attached to the shank end of the separation fastener so that the shank end of the fastener is punched within the die surface of the collar. By utilizing this optional collar, the gas pressure used to separate the fastener can be lowered. Further, the bending moment of the separation fastener increases.

OBJECTS OF THE INVENTION

It is an object of the invention to provide an improved separable fastener.

Another object of the invention is to provide an improved separable fastener that separates without damaging or destroying nearby equipment or personnel.

Yet another object of the invention is to provide an improved separable fastener that is usable in relatively small confines.

Still a further object of the invention is to provide an improved separable fastener that is self-sealing upon separation.

Other objects, advantages and new features of the invention will become apparent from the following detailed description of the invention when considered in conjunction with the accompanied drawings.

BRIEF DESCRIPTION OF THE DRAWINGS

FIG. 1 is a partially sectioned side view of the separable fastener of the invention shown incorporated with the optional collar.

FIG. 2 is a partially sectioned side view of the invention shown after separation has occurred.

FIG. 3 is an isometric view of the punch-piston of the invention shown with the retaining ring attached.

DESCRIPTION OF THE PREFERRED EMBODIMENT

In FIG. 1, a separable fastener 10 according to the invention is shown. In the embodiment shown, fastener 10 is attached and sealed to a wall 12 by conventional means, such as by a nut 13 and an O-ring 13A. The fastener includes a fastener body 14 having a shank end 16 and a head end 18. Shank end 16 is preferably threaded to facilitate the attachment of objects thereto. Head end 18 of fastener body 14 defines a generally cylindrical open-ended cavity, shown generally at 20.

Cavity 20 can be seen to have a closed end 22 that is proximate to shank end 16 of fastener body 14. Disposed within cylindrical cavity 20 is a generally cylindrical punch-piston 24. Punch 24 has a major diameter at a ridge 26 of the punch, this ridge also shown in FIG. 3. The surfaces of ridge 26 and of cylinder 20 substantially mate to permit the punch to slide within cavity 20. Punch 24 also has a minor diameter at a punch end 28 of the punch.

Referring to FIGS. 1 and 3, it can be seen that a retaining ring 30 is attached to a tail end 32 of punch 24. Retaining ring 30 is preferably threaded upon punch 24. Movement of punch 24 towards closed end 22 of cylinder 20 is prevented by ring 30 resting upon a shoulder 34 defined by the walls of cylinder 20.

Open-ended cylindrical cavity 20 is closed by a gas generator 36 shown in this example of the invention as being threaded onto fastener body 14. An O-ring 38 is inserted between gas generator 36 and fastener body 14 to help seal between these two elements.

Gas generator 36 can be, for example, of the type manufactured by Hi-Shear Corporation of Torrance, Calif. under the designation PC170-1.

The gas generator includes a pyrotechnic material 40 that is electrically ignited by way of conductor pins 42. As is typical of gas generators of this type, pins 42 pass through a glass-to-metal seal 44.

In the embodiment of the invention shown in FIG. 1, an O-ring 46 is placed between gas generator 36 and punch piston 24. This O-ring serves to prevent punch 24 from vibrating out of position so as to become canted within cylinder 20. Of course, other ways could be used to accomplish this purpose.

In FIG. 1, a collar 48 is shown threaded onto shank end 16 of fastener body 14. In a preferred embodiment of the invention, an object to be released by separable fastener 10 is attached to collar 48. Collar 48 includes a die surface 50 that interfaces with shank end 16 of fastener body 14. By attaching collar 48 to separable fastener 10, the bending moment properties of fastener 10 are improved and the gas pressure used to separate the fastener can be lowered.

Referring now to FIG. 2 a partially cross-sectioned view of the separable fastener of the invention is shown in which shank end 16 has been sheared from head end 18 of fastener 10.

Referring to FIGS. 1 and 2, the operation of the invention can be more readily understood. In operation, electrical signals to gas generator 36 cause an ignition of the pyrotechnic material therein. The burning pyrotechnic material causes an increase of pressure upon punch 24. In accordance with the invention the threads holding retaining ring 30 to punch 24 yield when a preselected gas pressure is reached. The release of punch 24 by retaining ring 30 permits the punch to be rapidly accelerated into closed end 22 of cylindrical cavity 20.

For example, in a prototype of the invention, ring 32 was constructed of 6061-T6 aluminum and was designed to yield when gas generator 36 developed approximately 20,000 pounds per square inch pressure. Punch 24 then accelerated to approximately 700 feet per second in a little over a quarter inch displacement.

The impact of punch 24 upon closed end 22 of cylindrical cavity 20 causes shank end 16 to be sheared from head end 18 of fastener body 14. The minor diameter of punch 24 at punch end 28 of the punch "punches out" a void 52 in fastener body 14 that is substantially equal to the minor diameter of the punch. The major diameter of punch 24 at ridge 26 becomes lodged within void 52 to seal the void, ridge 26 also shown in FIG. 3.

In a prototype embodiment of the invention, punch 24 was designed to punch a void in fastener body 14 of approximately 0.350 inches in diameter. Ridge 26 of punch 24 was 0.380 inches in diameter to wedge within the void. In this embodiment fastener body 14 was constructed of 15-5 stainless steel with punch 24 being fabricated of S5 tool steel. Punch 24 was approximately 0.380 inches long. The prototype incorporating a punch of the above dimensions was utilized with a separable fastener of a little over 2 ¼ inches long.

In both FIGS. 1 and 2, collar 48 is shown utilized with separable fastener 10. Collar 48 has die surface 50 that facilitates the shearing of shank end 16 from fastener body 14. By utilizing collar 48 with die surface 50, impact forces of punch 24 may be lessened so that the accompanying shock on surrounding attached equipment may be minimized. It should be noted that in prototype deployments of the invention separation of shank end 16 from body 14 of separable fastener 10 was successfully attained without the utilization of collar 48.

It must be emphasized that the specific embodiment disclosed is not intended to limit the invention. This embodiment has been disclosed in order to enable one skilled in the art to make and use the invention, however those skilled in the art will realize that, for example, the shapes, sizes, and materials of the punch, fastener body, and retaining ring can be changed to alter the separation or sealing characteristics of the separable fastener or to tailor the fastener to meet specific loading requirements. For example, an alternate embodiment could be designed so that separation of the fastener body occurs due to tensile overload, rather than shear overload. Further, the "die" action of the optional collar could be provided by another part which is preloaded against the fastener body of the invention. The retaining ring could be replaced by another retaining device and/or the travel of the punch piston could be changed to alter the requirements of the gas generator. Lastly the invention is by no means limited to use in small confines or only in environments in which a "sealing" function of the fastener is required. Those skilled in the art will realize that a fastener incorporating the features disclosed can be utilized in a great many environments and applications.

Obviously, many modifications and variations of the invention are possible in light of the above teachings. It must therefore be understood that within the scope of the appended claims, the invention may be practiced otherwise than has been specifically described.

What is claimed is:

1. A separable fastener comprising:
   a fastener body having a head end and a shank end, said head end defining an open-ended cavity having a closed end proximate to said shank end of said fastener body;
   a punch slideably disposed within said open-ended cavity and being moveable between a first position remote from said closed end of said fastener body cavity and a second position in contact with said closed end of said fastener body cavity;
   fluid pressure generating means for selectively generating at least a preselected fluid pressure upon said punch so that said punch is biased to said second position;
   means for closing and sealing said open-ended cavity of said fastener body; and
   restraining means for restraining said punch at said first position until said pressure generating means generates said preselected fluid pressure; so that said restraining means releases said punch when said pressure generating means generates said preselected fluid pressure so that said punch is propelled from said first position to said second position to separate said shank end of said fastener body from said head end of said fastener body.

2. A separable fastener as disclosed in claim 1 in which said open-ended cavity of said fastener body is generally cylindrical and in which said punch is generally cylindrical, an axis of said cylindrical punch being substantially aligned with an axis of said open-ended cylindrical cavity.

3. A separable fastener as disclosed in claim 2 in which said punch has minor and major diameters, said minor diameter being at a punch end of said punch with said punch end being disposed towards said closed end of said fastener body cavity.

4. A separable fastener as disclosed in claim 3 in which said punch lodges within and seals a void created in said fastener body by the separation of said shank end from said fastener body.

5. A separable fastener as disclosed in claim 1 in which said pressure generating means includes a gas generator.

6. A separable fastener as disclosed in claim 5 in which said pressure generating means further closes and seals said open-ended cavity of said fastener body.

7. A separable fastener as disclosed in claim 2 in which said restraining means includes:
   a shoulder defined in walls of said cylindrical fastener body cavity; and
   a ring attached to said punch, said ring engaging said shoulder of said fastener body cavity to opposes fluid pressure generated by said pressure generating means on said punch until said preselected pressure is reached at which time said ring yields to release said punch.

8. A separable fastener as disclosed in claim 1 further including a collar attached to said shank end of said separable fastener, said collar including a die surface interfacing with said separable fastener so that said shank end of said fastener body is punched within said die surface of said collar.

9. A separable fastener comprising:
   a fastener body having a head end and a shank end, said head end defining an open-ended cylindrical cavity having a closed end proximate to said shank end of said fastener body;
   a cylindrical punch slideably disposed within said open-ended cylindrical cavity and being moveable between a first position remote from said closed end of said fastener body cavity and a second position in contact with said closed end of said fastener body cavity, said punch having minor and major diameters and having a punch end and a tail end with said tail end being remote from said punch end, said minor diameter being at said punch end with said punch end being disposed towards said closed end of said fastener body cavity;
   fluid pressure generating means for selectively generating at least a preselected fluid pressure upon said tail end of said punch;
   means for closing and sealing said open-ended cavity of said fastener body; and
   restraining means for restraining said punch at said first position until said pressure generating means generates said preselected fluid pressure;
so that said restraining means releases said punch when said pressure generating means generates said preselected fluid pressure so that said punch is propelled from said first position to said second position to separate said shank end of said fastener body from said head end of said fastener body with said punch lodging within and sealing a void created in said fastener body by the shearing of said shank end from said fastener body.

10. A separable fastener as disclosed in claim 9 in which said pressure generating means includes a gas generator.

11. A separable fastener as disclosed in claim 9 in which said pressure generating means further closes and seals said open-ended cavity of said fastener body.

12. A separable fastener as disclosed in claim 9 in which said restraining means includes:
   a shoulder defined in walls of said cylindrical fastener body cavity; and
   a ring having threads engaged with said punch, said ring engaging said shoulder of said fastener body cavity to opposes fluid pressure generated by said pressure generating means on said punch until said preselected pressure is reached at which time said threads of said ring yield to release said punch.

13. A separable fastener as disclosed in claim 9 further including a collar attached to said shank end of said separable fastener, said collar including a die surface interfacing with said separable fastener so that said shank end of said fastener body is punched within said die surface of said collar.

* * * * *